United States Patent
Zhong et al.

(10) Patent No.: US 7,811,337 B2
(45) Date of Patent: Oct. 12, 2010

(54) ULTRACAPACITOR ELECTRODE WITH CONTROLLED SULFUR CONTENT

(75) Inventors: Linda Zhong, San Diego, CA (US); Xiaomei Xi, Carlsbad, CA (US); Porter Mitchell, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 12/528,445

(22) PCT Filed: Feb. 27, 2008

(86) PCT No.: PCT/US2008/055157
§ 371 (c)(1),
(2), (4) Date: Aug. 25, 2009

(87) PCT Pub. No.: WO2008/106529

PCT Pub. Date: Sep. 4, 2008

(65) Prior Publication Data

US 2010/0097741 A1   Apr. 22, 2010

Related U.S. Application Data

(63) Continuation of application No. 11/680,516, filed on Feb. 28, 2007, now abandoned.

(51) Int. Cl.
*H01L 21/00* (2006.01)
*H01L 21/64* (2006.01)
(52) U.S. Cl. .................... 29/25.02; 29/25.01
(58) Field of Classification Search ............. 29/25.01, 29/25.02, 25.03
See application file for complete search history.

(56) References Cited

U.S. PATENT DOCUMENTS

| 2,692,210 | A | 10/1954 | Burnham |
| 3,528,955 | A | 9/1970 | Lippman et al. |
| 3,864,124 | A | 2/1975 | Breton et al. |
| 4,129,633 | A | 12/1978 | Biddick |

(Continued)

FOREIGN PATENT DOCUMENTS

EP   0617441   9/1994

(Continued)

OTHER PUBLICATIONS

International search report for international application No. PCT/US2008/055157.

(Continued)

*Primary Examiner*—Charles D Garber
*Assistant Examiner*—Seahvosh J Nikmanesh
(74) *Attorney, Agent, or Firm*—Oppedahl Patent Law Firm LLC (57) ABSTRACT

Particles of active electrode material are made by blending mixing a mixture of activated carbon and binder. In selected implementations, sulfur level in the activated carbon is relatively low and the binder is inert. For example, sulfur content of the activated carbon and the resultant mixture is below 300 ppm and in other implementations, below 50 ppm. The electrode material may be attached to a current collector to obtain an electrode for use in various electrical devices, including a double layer capacitor. The electrode decreases current leakage of the capacitor.

14 Claims, 3 Drawing Sheets

U.S. PATENT DOCUMENTS

| | | | |
|---|---|---|---|
| 4,153,661 A | 5/1979 | Ree et al. | |
| 4,175,055 A | 11/1979 | Goller et al. | |
| 4,177,159 A | 12/1979 | Singer | |
| 4,194,040 A | 3/1980 | Breton et al. | |
| 4,287,232 A | 9/1981 | Goller et al. | |
| 4,313,972 A | 2/1982 | Goller et al. | |
| 4,317,789 A | 3/1982 | Groult et al. | |
| 4,320,184 A | 3/1982 | Bernstein et al. | |
| 4,320,185 A | 3/1982 | Bernstein et al. | |
| 4,336,217 A | 6/1982 | Sauer | |
| 4,354,958 A | 10/1982 | Solomon | |
| 4,379,772 A | 4/1983 | Solomon et al. | |
| 4,383,010 A | 5/1983 | Spaepen | |
| 4,482,931 A | 11/1984 | Yializis | |
| 4,500,647 A | 2/1985 | Solomon et al. | |
| 4,556,618 A | 12/1985 | Shia | |
| 4,683,516 A | 7/1987 | Miller | |
| 4,737,889 A | 4/1988 | Nishino et al. | |
| 4,758,473 A | 7/1988 | Herscovici et al. | |
| 4,822,701 A | 4/1989 | Ballard et al. | |
| 4,877,694 A | 10/1989 | Solomon et al. | |
| 4,895,775 A | 1/1990 | Kato et al. | |
| 4,917,309 A | 4/1990 | Zander et al. | |
| 4,992,910 A | 2/1991 | Evans | |
| 5,064,805 A | 11/1991 | Otowa | |
| 5,100,747 A | 3/1992 | Hayashida et al. | |
| 5,136,474 A | 8/1992 | Sarangapani et al. | |
| 5,144,595 A | 9/1992 | Graham et al. | |
| 5,150,283 A | 9/1992 | Yoshida et al. | |
| 5,162,178 A | 11/1992 | Ohsawa et al. | |
| 5,168,019 A | 12/1992 | Sugeno | |
| 5,198,313 A | 3/1993 | Juergens | |
| 5,214,564 A | 5/1993 | Metzler et al. | |
| 5,381,303 A | 1/1995 | Yoshida et al. | |
| 5,393,617 A | 2/1995 | Klein | |
| 5,436,093 A | 7/1995 | Huang et al. | |
| 5,450,279 A | 9/1995 | Yoshida et al. | |
| 5,456,000 A | 10/1995 | Gozdz et al. | |
| 5,470,357 A | 11/1995 | Schmutz et al. | |
| 5,478,363 A | 12/1995 | Klein | |
| 5,478,668 A | 12/1995 | Gozdz et al. | |
| 5,482,906 A | 1/1996 | Sakai et al. | |
| 5,557,497 A | 9/1996 | Ivanov et al. | |
| 5,593,462 A | 1/1997 | Gueguen et al. | |
| 5,621,607 A | 4/1997 | Farahmandi et al. | |
| 5,636,437 A | 6/1997 | Kaschmitter et al. | |
| 5,675,553 A | 10/1997 | O'Brien et al. | |
| 5,682,288 A | 10/1997 | Wani | |
| 5,698,342 A | 12/1997 | Klein | |
| 5,703,906 A | 12/1997 | O'Brien et al. | |
| 5,706,165 A | 1/1998 | Saito et al. | |
| 5,707,763 A | 1/1998 | Shimizu et al. | |
| 5,720,780 A | 2/1998 | Liu et al. | |
| 5,757,675 A | 5/1998 | O'Brien | |
| 5,778,515 A | 7/1998 | Menon | |
| 5,781,460 A | 7/1998 | Nguyen et al. | |
| 5,786,555 A | 7/1998 | Saito et al. | |
| 5,786,980 A | 7/1998 | Evans | |
| 5,840,087 A | 11/1998 | Gozdz et al. | |
| 5,846,675 A | 12/1998 | Sazhin et al. | |
| 5,849,431 A | 12/1998 | Kita et al. | |
| 5,879,836 A | 3/1999 | Ikeda et al. | |
| 5,914,019 A | 6/1999 | Dodgson et al. | |
| 5,955,215 A | 9/1999 | Kurzweil et al. | |
| 5,966,414 A | 10/1999 | O'Brien | |
| 5,973,912 A | 10/1999 | Kibi et al. | |
| 6,022,436 A | 2/2000 | Koslow et al. | |
| 6,024,773 A | 2/2000 | Inuzuka et al. | |
| 6,031,712 A | 2/2000 | Kurihara et al. | |
| 6,072,692 A | 6/2000 | Hiratsuka et al. | |
| 6,094,338 A | 7/2000 | Hirahara et al. | |
| 6,110,335 A | 8/2000 | Avarbz et al. | |
| 6,114,835 A | 9/2000 | Price | |
| 6,127,474 A | 10/2000 | Andelman | |
| 6,134,760 A | 10/2000 | Mushiake et al. | |
| 6,159,611 A | 12/2000 | Lee et al. | |
| 6,181,545 B1 | 1/2001 | Amatucci et al. | |
| 6,187,061 B1 | 2/2001 | Amatucci et al. | |
| 6,207,251 B1 | 3/2001 | Balsimo et al. | |
| 6,222,715 B1 | 4/2001 | Gruhn | |
| 6,225,733 B1 | 5/2001 | Gadkaree et al. | |
| 6,236,560 B1 | 5/2001 | Ikeda et al. | |
| 6,238,818 B1 | 5/2001 | Dalton | |
| 6,245,464 B1 | 6/2001 | Spillman et al. | |
| 6,246,568 B1 | 6/2001 | Nakao et al. | |
| 6,259,595 B1 | 7/2001 | Hebel et al. | |
| 6,262,360 B1 | 7/2001 | Michel | |
| 6,301,092 B1 | 10/2001 | Hata et al. | |
| 6,304,426 B1 | 10/2001 | Wei et al. | |
| 6,306,509 B2 | 10/2001 | Takeuchi et al. | |
| 6,308,405 B1 | 10/2001 | Takamatsu et al. | |
| 6,310,756 B1 | 10/2001 | Miura et al. | |
| 6,310,759 B2 | 10/2001 | Ishigaki et al. | |
| 6,310,762 B1 | 10/2001 | Okamura et al. | |
| 6,323,750 B1 | 11/2001 | Lampl et al. | |
| 6,349,027 B1 | 2/2002 | Suhara et al. | |
| 6,359,769 B1 | 3/2002 | Mushiake et al. | |
| 6,377,441 B1 | 4/2002 | Ohya et al. | |
| 6,397,274 B1 | 5/2002 | Miller | |
| 6,403,257 B1 | 6/2002 | Christian et al. | |
| 6,424,514 B1 | 7/2002 | Boy et al. | |
| 6,447,669 B1 | 9/2002 | Lain | |
| 6,452,782 B1 | 9/2002 | Otsuki et al. | |
| 6,459,564 B1 | 10/2002 | Watanabe et al. | |
| 6,466,516 B1 | 10/2002 | O'Brien et al. | |
| 6,491,789 B2 | 12/2002 | Niu | |
| 6,493,210 B2 | 12/2002 | Nonaka et al. | |
| 6,522,523 B2 | 2/2003 | Takatomi et al. | |
| 6,558,835 B1 | 5/2003 | Kurisu et al. | |
| 6,585,915 B2 | 7/2003 | Shinozaki et al. | |
| 6,589,299 B2 | 7/2003 | Missling et al. | |
| 6,614,646 B2 | 9/2003 | Bogaki et al. | |
| 6,627,252 B1 | 9/2003 | Nanjundiah et al. | |
| 6,645,664 B2 | 11/2003 | Nakanishi et al. | |
| 6,665,169 B2 | 12/2003 | Tennent et al. | |
| 6,677,078 B2 | 1/2004 | Reise et al. | |
| 6,697,249 B2 | 2/2004 | Maletin et al. | |
| 6,708,757 B2 | 3/2004 | Hebel et al. | |
| 6,714,402 B2 | 3/2004 | Kamath | |
| 6,721,168 B2 | 4/2004 | Takeuchi et al. | |
| 6,761,744 B1 | 7/2004 | Tsukamoto et al. | |
| 6,768,056 B2 | 7/2004 | Fischer et al. | |
| 6,795,297 B2 | 9/2004 | Iwaida et al. | |
| 6,804,108 B2 | 10/2004 | Nanjundiah et al. | |
| 6,808,845 B1 | 10/2004 | Nonaka et al. | |
| 6,831,826 B2 | 12/2004 | Iwaida et al. | |
| 6,841,594 B2 | 1/2005 | Jones et al. | |
| 6,847,517 B2 | 1/2005 | Iwaida et al. | |
| 6,905,798 B2 | 6/2005 | Tsukuda et al. | |
| 6,906,911 B2 | 6/2005 | Ikeda et al. | |
| 6,912,116 B2 | 6/2005 | Takahashi et al. | |
| 6,914,768 B2 | 7/2005 | Matsumoto et al. | |
| 6,918,991 B2 | 7/2005 | Chickering et al. | |
| 6,962,745 B2 | 11/2005 | Penneau et al. | |
| 7,018,568 B2 | 3/2006 | Tierney | |
| 7,029,796 B2 * | 4/2006 | Choi et al. | ............. 429/232 |
| 7,061,749 B2 | 6/2006 | Liu et al. | |
| 7,090,946 B2 | 8/2006 | Mitchell et al. | |
| 7,139,162 B2 | 11/2006 | Michel et al. | |
| 7,141,230 B2 | 11/2006 | Takeuchi | |
| 7,147,744 B2 | 12/2006 | Kaz et al. | |
| 7,198,865 B2 | 4/2007 | Sloop | |
| 7,199,997 B1 | 4/2007 | Lipka et al. | |
| 7,206,190 B2 | 4/2007 | Murakami et al. | |

| | | |
|---|---|---|
| 7,227,737 B2 | 6/2007 | Mitchell et al. |
| 7,236,348 B2 | 6/2007 | Asano et al. |
| 7,245,478 B2 | 7/2007 | Zhong et al. |
| 7,295,423 B1 | 11/2007 | Mitchell et al. |
| 7,307,830 B2 | 12/2007 | Gallay et al. |
| 7,342,770 B2 | 3/2008 | Mitchell et al. |
| 7,352,558 B2 | 4/2008 | Zhong et al. |
| 7,384,433 B2 | 6/2008 | Mitchell et al. |
| 7,384,686 B2 | 6/2008 | Penneau et al. |
| 2002/0114126 A1 | 8/2002 | Hirahara et al. |
| 2002/0122985 A1 | 9/2002 | Sato et al. |
| 2002/0163773 A1 | 11/2002 | Niiori et al. |
| 2003/0113636 A1 | 6/2003 | Sano et al. |
| 2004/0130852 A1 | 7/2004 | Matsumoto et al. |
| 2005/0057888 A1 | 3/2005 | Mitchell et al. |
| 2005/0064289 A1 | 3/2005 | Suzuki et al. |
| 2005/0250011 A1 | 11/2005 | Mitchell et al. |
| 2005/0266298 A1 | 12/2005 | Mitchell et al. |
| 2005/0266990 A1 | 12/2005 | Iwasaki et al. |
| 2005/0271798 A1 | 12/2005 | Zhong et al. |
| 2006/0021880 A1* | 2/2006 | Sandoval et al. ............ 205/576 |
| 2006/0035785 A1 | 2/2006 | Tenaka |
| 2006/0054277 A1 | 3/2006 | Byun et al. |
| 2006/0098289 A1 | 5/2006 | McCabe et al. |
| 2006/0098389 A1 | 5/2006 | Liu et al. |
| 2006/0105624 A1 | 5/2006 | Yoshikane et al. |
| 2006/0109608 A1 | 5/2006 | Zhong et al. |
| 2006/0114643 A1 | 6/2006 | Mitchell et al. |
| 2006/0133013 A1 | 6/2006 | Xi et al. |
| 2006/0137158 A1 | 6/2006 | Zou et al. |
| 2006/0146475 A1 | 7/2006 | Zhong et al. |
| 2006/0147712 A1 | 7/2006 | Mitchell et al. |
| 2006/0148191 A1 | 7/2006 | Mitchell et al. |
| 2006/0246343 A1 | 11/2006 | Mitchell et al. |
| 2006/0291139 A1 | 12/2006 | Nedoshivin et al. |
| 2007/0008677 A1 | 1/2007 | Zhong et al. |
| 2007/0026317 A1 | 2/2007 | Mitchell et al. |
| 2007/0122698 A1 | 5/2007 | Mitchell et al. |
| 2007/0177334 A1 | 8/2007 | Thrap |
| 2007/0184711 A1 | 8/2007 | Thrap et al. |
| 2007/0190424 A1 | 8/2007 | Mitchell et al. |
| 2007/0201185 A1 | 8/2007 | Yoshio et al. |
| 2007/0258189 A1 | 11/2007 | Tano et al. |
| 2008/0092808 A1 | 4/2008 | Mitchell et al. |
| 2008/0102371 A1 | 5/2008 | Mitchell et al. |
| 2008/0117564 A1 | 5/2008 | Zhong et al. |
| 2008/0117565 A1 | 5/2008 | Zhong et al. |

FOREIGN PATENT DOCUMENTS

| | | |
|---|---|---|
| EP | 1009058 | 6/2000 |
| EP | 1126536 | 8/2001 |
| JP | 01241811 A | 9/1989 |
| JP | 04-067610 | 3/1992 |
| JP | 04-088619 | 3/1992 |
| JP | 05-129020 | 5/1993 |
| JP | 08-096810 | 4/1996 |
| JP | 09-183604 | 7/1997 |
| JP | 10-287412 A | 10/1998 |
| JP | 2004-002105 A | 1/2004 |
| JP | 2004296181 A | 10/2004 |
| WO | 2006001847 A1 | 1/2006 |
| WO | 2006135495 | 12/2006 |

OTHER PUBLICATIONS

Written opinion for international application No. PCT/US2008/055157.

TIMCAL Graphite & Carbon, "TIMREX Graphite ENSACO Carbon Black Carbon additives for ploymer compounds", 2004, p. 6-7.

Dr. Steve Dietz and Dean Recla, "Optimization of Sugar Derived Carbons", Dec. 2005.

* cited by examiner

ULTRACAPACITOR ELECTRODE WITH CONTROLLED SULFUR CONTENT

This application claims the benefit of U.S. nonprovisional application Ser. No. 11/680,516 filed 28 Feb. 2007, which is hereby incorporated by reference as though fully set forth herein.

BACKGROUND

The present invention generally relates to electrodes and the fabrication of electrodes. More specifically, the present invention relates to electrodes used in energy storage devices, such as electrochemical double layer capacitors.

Electrodes are widely used in many devices that store electrical energy, including primary (non-rechargeable) battery cells, secondary (rechargeable) battery cells, fuel cells, and capacitors. Important characteristics of electrical energy storage devices include energy density, power density, maximum charging rate, internal leakage current, equivalent series resistance (ESR), and/or durability, i.e., the ability to withstand multiple charge-discharge cycles. For a number of reasons, double layer capacitors, also known as supercapacitors and ultracapacitors, are gaining popularity in many energy storage applications. The reasons include availability of double layer capacitors with high power densities (in both charge and discharge modes), and with energy densities approaching those of conventional rechargeable cells.

Double layer capacitors typically use as their energy storage element electrodes immersed in an electrolyte (an electrolytic solution). As such, a porous separator immersed in and impregnated with the electrolyte may ensure that the electrodes do not come in contact with each other, preventing electronic current flow directly between the electrodes. At the same time, the porous separator allows ionic currents to flow through the electrolyte between the electrodes in both directions. As discussed below, double layers of charges are formed at the interfaces between the solid electrodes and the electrolyte.

When electric potential is applied between a pair of electrodes of a double layer capacitor, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the double layer capacitors through orientation and alignment of molecules of the electrolytic solution under influence of the electric field induced by the potential. This mode of energy storage, however, is secondary.

In comparison to conventional capacitors, double layer capacitors have high capacitance in relation to their volume and weight. There are two main reasons for these volumetric and weight efficiencies. First, the charge separation layers are very narrow. Their widths are typically on the order of nanometers. Second, the electrodes can be made from a porous material, having very large effective surface area per unit volume. Because capacitance is directly proportional to the electrode area and inversely proportional to the widths of the charge separation layers, the combined effect of the large effective surface area and narrow charge separation layers is capacitance that is very high in comparison to that of conventional capacitors of similar size and weight. High capacitance of double layer capacitors allows the capacitors to receive, store, and release large amount of electrical energy.

Electrical energy stored in a capacitor is determined using a well-known formula:

$$E = \frac{C * V^2}{2}. \quad (1)$$

In this formula, E represents the stored energy, C stands for the capacitance, and V is the voltage of the charged capacitor. Thus, the maximum energy ($E_m$) that can be stored in a capacitor is given by the following expression:

$$E_m = \frac{C * V_r^2}{2}, \quad (2)$$

where $V_r$ stands for the rated voltage of the capacitor. It follows that a capacitor's energy storage capability depends on both (1) its capacitance, and (2) its rated voltage. Increasing these two parameters may therefore be important to capacitor performance. Indeed, because the total energy storage capacity varies linearly with capacitance and as a second order of the voltage rating, increasing the voltage rating can be the more important of the two objectives.

Voltage ratings of double layer capacitors are generally limited by electro-chemical reactions (e.g., reduction or oxidation) and breakdown that take place within the electrolytic solution in presence of an electric field induced between capacitor electrodes. Electrolytes currently used in double layer capacitors are of two kinds. The first kind includes aqueous electrolytic solutions, for example, potassium hydroxide and sulfuric acid solutions.

Double layer capacitors may also be made with organic electrolytes, such as propylene carbonate (PC) solution, acetonitrile (AN) solution, liquid salts commonly referred to as ionic liquids, certain liquid crystal electrolytes, and even solid electrolytes.

Double layer capacitor cells manufactured using organic electrolytes and activated carbon have typically been rated at or below 2.3 volts in order to achieve a commercially acceptable number of charge-discharge cycles. Even small increases in the rated voltage above 2.3 volts tend to reduce substantially the number of charge-discharge cycles that the capacitors can withstand without significant deterioration in performance. As an approximation, every 100 millivolt increase in the rated capacitor voltage results in halving of the number of charge-discharge cycles that the capacitor can reliably withstand.

It would be desirable to increase actual breakdown voltage of electrolyte in electrical devices with porous electrodes, such as double layer capacitors. It would also be desirable to improve reliability and durability of double layer capacitors, as measured by the number of charge-discharge cycles that a double layer capacitor can withstand without a significant deterioration in its operating characteristics. It would further be desirable to provide porous electrodes that, when immersed in an electrolyte, do not lower the breakdown voltage of the electrolyte to the same extent as conventionally known porous electrodes. Additionally, it would be desirable to provide electrical devices, such as double layer capacitors, using these electrodes.

A need thus exists for porous electrodes that, when immersed in electrolyte, do not lower the electrolyte's breakdown voltage to the same extent as conventional porous electrodes. A need also exists for methods and materials for making such porous electrodes, and for electrical devices, including double layer capacitors, using such electrodes.

SUMMARY

Various implementations hereof are directed to methods, electrodes, electrode assemblies, and electrical devices that may be directed to or may satisfy one or more of the above needs. An exemplar implementation herein disclosed is a method of making particles of active electrode material. In accordance with such a method, particles of activated carbon, optional conductive carbon, and binder may be mixed. In aspects hereof, the activated carbon may have a sulfur content of between about 0 and about 50 parts per million, in some instances not exceeding about 50 parts per million. In aspects hereof, the optional conductive carbon includes a low contamination level and/or high conductivity conductive carbon particles. In aspects hereof, sulfur content may be controlled through reducing sulfur content during pre-processing of either or both of the carbon components, e.g., the activated and/or conductive carbon. In aspects hereof, removing, or limiting or eliminating introduction of sulfur during pre-processing of such components may include washing or other carbon cleaning techniques, materials, devices and/or methods.

In accordance with some alternative aspects hereof, the binder is an electro-chemically inert binder, such as PTFE. The proportion of the inert binder may be between about 3 and about 20 percent by weight, an in some other instances between about 9 and about 11 percent by weight, or may be, for example, about 10 percent by weight. In accordance with some aspects hereof, the proportion of the optional conductive particles in the resultant mixture may be between about 0 and about 15 percent by weight, and in some instances does not exceed about 0.5 percent by weight. In accordance with further alternative aspects hereof, mixing of the activated carbon, optional conductive carbon, and binder may be performed by dry-blending these ingredients. In accordance with some further alternative aspects hereof, the mixing may be carried out by subjecting the activated carbon, optional conductive carbon, and binder to a non-lubricated high-shear force technique. In accordance with still further alternative aspects hereof, films of active electrode material may be made from the particles of active electrode material made as is described herein. The films may be attached to current collectors and used in various electrical devices, for example, in double layer capacitors.

In one implementation, a method of making particles of active electrode material may include providing activated carbon with sulfur content of between about 0 and about 50 parts per million, in many cases not exceeding about 50 parts per million; providing binder; mixing the activated carbon and the binder to obtain a mixture. The method may in some options further include providing conductive carbon particles. In one implementation, the binder may be or may include PTFE. In one implementation, the operation of mixing may include dry blending the activated carbon, conductive carbon, and the binder. In one implementation, the operation of mixing may be performed without processing additives.

In one implementation, an electrode may include a current collector; and a film of active electrode material attached to the current collector, wherein the active electrode material may include particles of activated carbon with a sulfur content of between about 0 and about 50 parts per million, in some instances of less than about 50 ppm. The active electrode material may include binder. The active electrode material may include conductive carbon particles. In some implementations, the sulfur content of the activated carbon may be less than about 300 ppm sulfur.

In one implementation, a method of making particles of active electrode material may include providing activated carbon with a sulfur content of between about 0 and about 50 parts per million, or not exceeding about 50 parts per million; providing optional low contamination level conductive carbon particles; providing binder; and, mixing the activated carbon, the conductive carbon, and the binder to obtain a mixture.

In one implementation, an electrochemical double layer capacitor may include a first electrode comprising a first current collector and a first film of active electrode material, the first film comprising a first surface and a second surface, the first current collector being attached to the first surface of the first film; a second electrode comprising a second current collector and a second film of active electrode material, the second film comprising a third surface and a fourth surface, the second current collector being attached to the third surface of the second film; a porous separator disposed between the second surface of the first film and the fourth surface of the second film; a container; an electrolyte; wherein: the first electrode, the second electrode, the porous separator, and the electrolyte are disposed in the container; the first film is at least partially immersed in the electrolyte; the second film is at least partially immersed in the electrolyte; the porous separator is at least partially immersed in the electrolyte; each of the first and second films may include a mixture of activated carbon with a sulfur content of between about 0 and about 50 parts per million, typically not exceeding about 50 parts per million. In one implementation, the electrode films further may include conductive carbon. In one implementation, the electrode films further may include binder. In one implementation, the films are attached to respective collectors via a conductive adhesive layer.

These and other features and aspects of the present invention will be better understood with reference to the following description, drawings, and appended claims.

BRIEF DESCRIPTION OF THE DRAWINGS

FIG. 2, which includes sub-part

DETAILED DESCRIPTION

In this document, the words "implementation" and "variant" may be used to refer to a particular apparatus, process, or article of manufacture, and not necessarily always to one and the same apparatus, process, or article of manufacture. Thus, "one implementation" (or a similar expression) used in one place or context can refer to one particular apparatus, process, or article of manufacture; and, the same or a similar expression in a different place can refer either to the same or to a different apparatus, process, or article of manufacture. Similarly, "some implementations," "certain implementations," or similar expressions used in one place or context may refer to one or more particular apparatuses, processes, or articles of manufacture; the same or similar expressions in a different place or context may refer to the same or a different apparatus, process, or article of manufacture. The expression "alternative implementation" and similar phrases are used to indicate one of a number of different possible implementations. The number of possible implementations is not necessarily limited to two or any other quantity. Characterization of an implementation as "an exemplar" or "exemplary" means that the implementation is used as an example. Such characterization does not necessarily mean that the implementation is a preferred implementation; the implementation may but need not be a currently preferred implementation.

The expression "active electrode material" and similar phrases signify material that provides or enhances the function of the electrode beyond simply providing a contact or reactive area approximately the size of the visible external surface of the electrode. In a double layer capacitor electrode, for example, a film of active electrode material includes particles with high porosity, so that the surface area of the electrode exposed to an electrolyte in which the electrode is immersed may be increased well beyond the area of the visible external surface; in effect, the surface area exposed to the electrolyte becomes a function of the volume of the film made from the active electrode material.

The meaning of the word "film" is similar to the meaning of the words "layer" and "sheet"; the word "film" does not necessarily imply a particular thickness or thinness of the material. When used to describe making of active electrode material film, the terms "powder," "particles," and the like refer to a plurality of small granules. As a person skilled in the art would recognize, particulate material is often referred to as a powder, grain, specks, dust, or by other appellations. References to carbon and binder powders throughout this document are thus not meant to limit the present implementations.

The references to "binder" within this document are intended to convey the meaning of polymers, co-polymers, and similar ultra-high molecular weight substances capable of providing a binding for the carbon herein. Such substances are often employed as binder for promoting cohesion in loosely-assembled particulate materials, i.e., active filler materials that perform some useful function in a particular application.

The words "calender," "nip," "laminator," and similar expressions mean a device adapted for pressing and compressing. Pressing may be, but is not necessarily, performed using rollers. When used as verbs, "calender" and "laminate" mean processing in a press, which may, but need not, include rollers. Mixing or blending as used herein may mean processing which involves bringing together component elements into a mixture. High shear or high impact forces may be, but are not necessarily, used for such mixing. Example equipment that can be used to prepare/mix the dry powder(s) hereof may include, in non-limiting fashion: a ball mill, an electromagnetic ball mill, a disk mill, a pin mill, a high-energy impact mill, a fluid energy impact mill, an opposing nozzle jet mill, a fluidized bed jet mill, a hammer mill, a fritz mill, a Warring blender, a roll mill, a mechanofusion processor (e.g., a Hosokawa AMS), or an impact mill.

Other and further definitions and clarifications of definitions may be found throughout this document. The definitions are intended to assist in understanding this disclosure and the appended claims, but the scope and spirit of the invention should not be construed as strictly limited to the definitions, or to the particular examples described in this specification.

Reference will now be made in detail to several implementations of the invention that are illustrated in the accompanying drawings. The same reference numerals are used in the drawings and the description to refer to the same or substantially the same parts or operations. The drawings are in simplified form and not to precise scale. For purposes of convenience and clarity only, directional terms, such as top, bottom, left, right, up, down, over, above, below, beneath, rear, and front may be used with respect to the accompanying drawings. These and similar directional terms, should not be construed to limit the scope of the invention.

Figure 1:
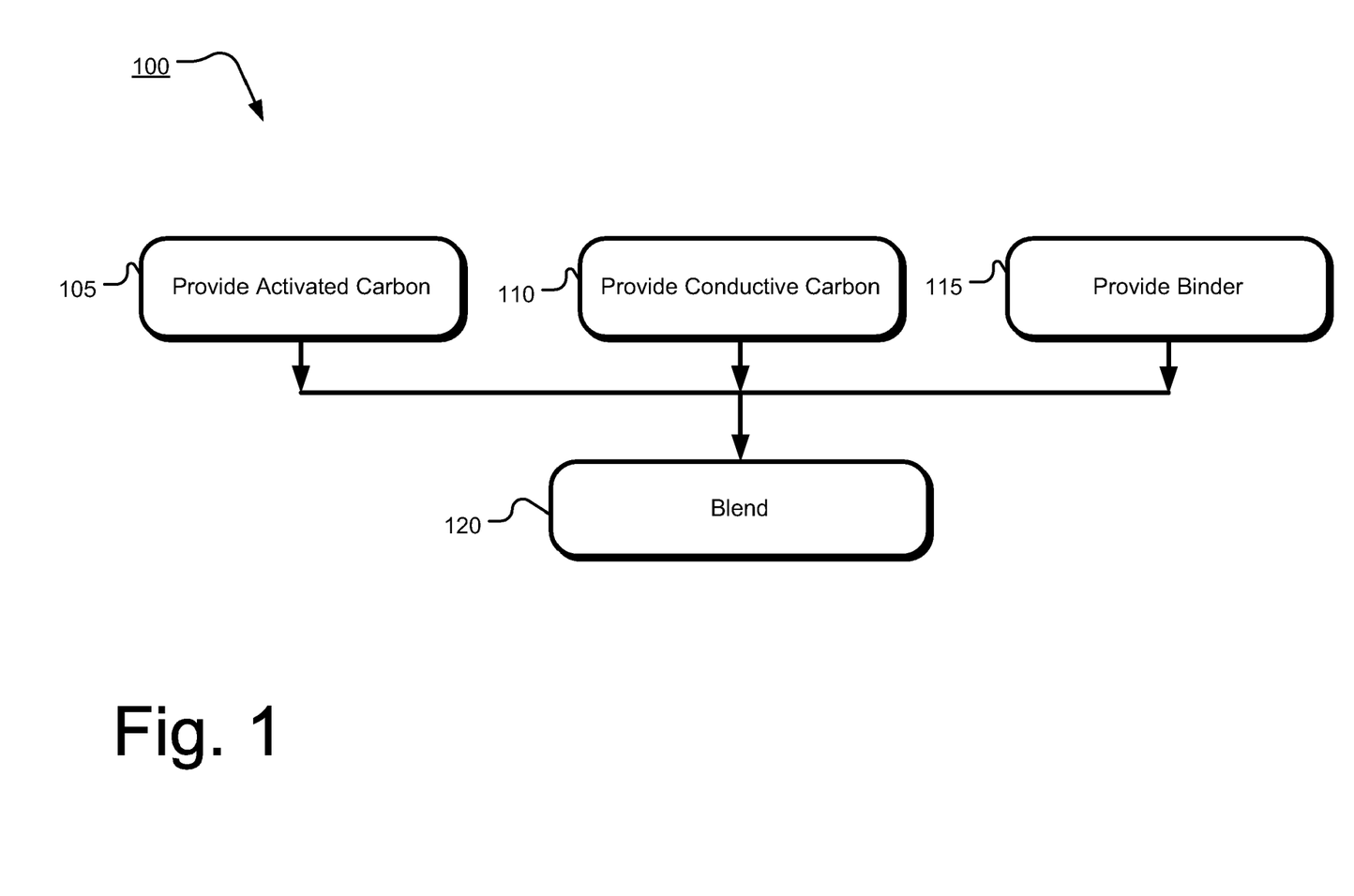
FIG. 1 illustrates selected operations of a process for making active electrode material in accordance with some aspects hereof.

Referring more particularly to the drawings, FIG. 1 illustrates selected operations of a dry process 100 for making active electrode material. Although the process operations are described substantially serially, certain operations may also be performed in alternative order, in conjunction or in parallel, in a pipelined manner, or otherwise. There is no particular requirement that the operations be performed in the same order in which this description lists them, except where explicitly so indicated, otherwise made clear from the context, or inherently required. Not all illustrated operations may be strictly necessary, while other optional operations may be added to the process 100. A high level overview of the process 100 is provided immediately below. A more detailed description of the operations of the process 100 and variants of the operations are provided following the overview.

In operation 105, activated carbon particles with reduced or controlled sulfur content may be provided. In operation 110, optional conductive carbon particles with low contamination level and high conductivity may be provided. In operation 115, binder may be provided. In one or more implementations, and although one or more of a variety of binders may be used as described elsewhere herein, the binder may include polytetrafluoroethylene (also known as PTFE or by the tradename, "Teflon®"). In operation 120, one or more of the activated carbon, conductive carbon, and binder may be blended or mixed; typically two or more may be mixed together. Alternatively, in certain implementations one or more of these ingredients and/or operations may be omitted.

More detailed descriptions of individual operations of the process 100 in preferred and alternative forms are now set forth. As a first example, operation 105, in which activated carbon particles with a controlled or reduced sulfur content is provided, is first described. Electrodes made from activated carbon particles with controlled sulfur content tend to have a lower leakage current and/or a higher breakdown voltage of the electrolyte in which the electrodes are immersed, than in the case of activated carbon particles with a relatively higher sulfur content. Accordingly, in some implementations the activated carbon particles provided in operation 105 have sulfur content of 50 parts per million (ppm) or less. In some more specific implementations, sulfur content of the activated carbon particles may be at or less than about 300 ppm. Some sulfur contents of commercially available activated carbon may be on the order of about 4000 ppm.

Moreover, a further reduction of the level of contaminants in the optional conductive carbon of an electrode may further allow for a decrease in the leakage current and/or an increase in the breakdown voltage of electrolyte in which an electrode including the conductive carbon is disposed. Thus, when optional conductive carbon particles are provided in operation 110 they desirably may include a low total level of contaminants. The conductive particles also preferably have a relatively high conductivity. In one implementation, total impurity content (other than ash) in conductive carbon is below about 120 ppm. Table I below shows typical contaminant levels in conductive carbon utilized by some of the present implementations.

TABLE I

| IMPURITY | UNIT | IMPURITY LEVEL (Typical) |
|---|---|---|
| ash | % | 0.01 |
| Al | ppm | 0.8 |
| Ba | ppm | <0.2 |
| Ca | ppm | 8.4 |
| Cd | ppm | <0.1 |
| Co | ppm | <0.1 |
| Cr | ppm | <2 |
| Cu | ppm | <0.2 |
| Fe | ppm | 10 |
| Hg | ppm | 1.3 |
| K | ppm | 0.5 |
| Mg | ppm | 1 |
| Mn | ppm | 0.1 |
| Mo | ppm | <0.5 |
| Na | ppm | 8 |
| Ni | ppm | 0.5 |
| P | ppm | <3 |
| Pb | ppm | <1 |
| S | ppm | 70 |
| Sb | ppm | <4 |
| Se | ppm | <0.5 |
| Si | ppm | 2 |
| Sn | ppm | <3 |
| Sr | ppm | <0.2 |
| Ti | ppm | <0.1 |
| V | ppm | <0.2 |
| Zn | ppm | 0.5 |

Conductive carbon particles with substantially similar or lower contamination levels and conductivities that are substantially similar to or higher than that of TABLE I may be processed to obtain similar characteristics using techniques known to those skilled in the art. Thus, it should be understood that no implementations are to be limited to particular brands or suppliers of carbon or other materials.

It may be in many implementations that the sulfur content may be controlled through control of the respective amounts of sulfur in the preliminary/intermediate components, e.g., the activated carbon on one hand and the optional conductive carbon on another hand. Thus, by controlling these respective sulfur contents, then the resulting mixture of activated carbon and conductive carbon may have a controlled amount of sulfur of between about 0 and about 50 parts per million including up to about 50 ppm, and in many implementations at less than about 50 ppm, or in some cases, less than about 300 ppm (the sulfur content of the binder should also be controlled, however, this would typically be an insignificant contributor of sulfur in most cases).

Even so, impurities can be introduced or attach themselves either in a natural or raw material stage, or during other processing operations. Nevertheless, washing or other techniques of pre-processing the preliminary materials of either or both the activated carbon and/or the optional conductive carbon may be performed to reduce and/or control the sulfur content of such carbon materials.

In operation 115, binders may be provided, for example: PTFE in granular powder form, and/or various fluoropolymer particles, polypropylene, polyethylene, co-polymers, and/or other polymer blends. It has been identified, that the use of inert binders such as PTFE, tends to increase the voltage at which an electrode including such an inert binder may be operated. Such increase occurs in part due to reduced interactions with electrolyte in which the electrode is subsequently immersed (electrolyte alternative examples are described further below). In one implementation, typical diameters of the PTFE particles may be in the five hundred micron range.

In the operation 120, activated carbon particles and binder particles may be blended or otherwise mixed together. In various implementations, proportions of activated carbon and binder may be as follows: about 80 to about 97 percent by weight of activated carbon, about 3 to about 20 percent by weight of PTFE. Optional conductive carbon could be added in a range of about 0 to about 15 percent by weight. An implementation may contain about 89.5 percent of activated carbon, about 10 percent of PTFE, and about 0.5 percent of conductive carbon. Other ranges are within the scope hereof as well. Note that all percentages are here presented by weight, though other percentages with other bases may be used. Conductive carbon may be preferably held to a low percentage of the mixture because an increased proportion of conductive carbon may tend to lower the breakdown voltage of electrolyte in which an electrode made from the conductive carbon particles is subsequently immersed.

In an implementation of the process 100, the blending operation 120 may be a "dry-blending" operation, i.e., blending of activated carbon, conductive carbon, and/or binder is performed without the addition of any solvents, liquids, processing aids, or the like to the particle mixture. Dry-blending may be carried out, for example, for about 1 to about 10 minutes in a mill, mixer or blender (such as a V-blender equipped with a high intensity mixing bar, or other alternative equipment as described further below), until a uniform dry mixture is formed. Those skilled in the art will identify, after perusal of this document, that blending time can vary based on batch size, materials, particle size, densities, as well as other properties, and yet remain within the scope hereof.

As introduced above, the blended dry powder material may also or alternatively be formed/mixed/blended using other equipment. Such equipment that can be used to prepare/mix the dry powder(s) hereof may include, for non-limiting examples: blenders of many sorts including rolling blenders and warring blenders, and mills of many sorts including ball mills, electromagnetic ball mills, disk mills, pin mills, high-energy impact mills, fluid energy impact mills, opposing nozzle jet mills, fluidized bed jet mills, hammer mills, fritz mills, roll mills, mechanofusion processing (e.g., a Hosokawa AMS), or impact mills. In an implementation, the dry powder material may be dry mixed using non-lubricated high-shear or high impact force techniques. In an implementation, high-shear or high impact forces may be provided by a mill such as one of those described above. The dry powder material may be introduced into the mill, wherein high-velocities and/or high forces could then be directed at or imposed upon the dry powder material to effectuate application of high shear or high impact to the binder within the dry powder material. The shear or impact forces that arise during the dry mixing process may physically affect the binder, causing the binder to bind the binder to and/or with other particles within the material.

Although additives, such as solvents, liquids, and the like, are not necessarily used in the manufacture of certain implementations disclosed herein, a certain amount of impurity, for example, moisture, may be absorbed by the active electrode material from the surrounding environment. Those skilled in the art will understand, after perusal of this document, that the dry particles used with implementations and processes disclosed herein may also, prior to being provided by particle manufacturers as dry particles, have themselves been pre-processed with additives and, thus, contain one or more pre-process residues. For these reasons, one or more of the implementations and processes disclosed herein may utilize a drying operation at some point before a final electrolyte impregnation operation, so as to remove or reduce the aforementioned pre-process residues and impurities. Even after one or more drying operations, trace amounts of moisture, residues and impurities may be present in the active electrode material and an electrode film made therefrom.

A dry mixing process is described in more detail in a co-pending commonly-assigned U.S. patent application Ser. No. 11/116,882. This application is hereby incorporated by reference for all it discloses as if fully set forth herein, including all figures, tables, and claims.

It should also be noted that references to dry-blending, dry particles, and other dry materials and processes used in the manufacture of an active electrode material and/or film do not exclude the use of other than dry processes, for example, this may be achieved after drying of particles and films that may have been prepared using a processing aid, liquid, solvent, or the like.

A product obtained through a process like process 100 may be used to make an electrode film. The films may then be bonded to a current collector, such as a foil made from aluminum or another conductor. The current collector can be a continuous metal foil, metal mesh, or nonwoven metal fabric. The metal current collector provides a continuous electrically conductive substrate for the electrode film. The current collector may be pretreated prior to bonding to enhance its adhesion properties. Pretreatment of the current collector may include mechanical roughing, chemical pitting, and/or use of a surface activation treatment, such as corona discharge, active plasma, ultraviolet, laser, or high frequency treatment methods known to a person skilled in the art. In one implementation, the electrode films may be bonded to a current collector via an intermediate layer of conductive adhesive known to those skilled in the art.

In one implementation, a product obtained from process 100 may be mixed with a processing aid to obtain a slurry-like composition used by those skilled in the art to coat an electrode film onto a collector (i.e. a coating process). The slurry may be then deposited on one or both sides of a current collector. After a drying operation, a film or films of active electrode material may be formed on the current collector. The current collector with the films may be calendered one or more times to densify the films and to improve adhesion of the films to the current collector.

In one implementation, a product obtained from process 100 may be mixed with a processing aid to obtain a paste-like material. The paste-like material may be then be extruded, formed into a film, and deposited on one or both sides of a current collector. After a drying operation, a film or films of active electrode material may be formed on the current collector. The current collector with the dried films may be calendered one or more times to densify the films and to improve adhesion of the films to the current collector.

In yet another implementation, in a product obtained through the process 100 the binder particles may include thermoplastic or thermoset particles. A product obtained through the process 100 that includes thermoplastic or thermoset particles may be used to make an electrode film. Such a film may then be bonded to a current collector, such as a foil made from aluminum or another conductor. The films may be bonded to a current collector in a heated calendar apparatus. The current collector may be pretreated prior to bonding to enhance its adhesion properties. Pretreatment of the current collector may include mechanical roughing, chemical pitting, and/or use of a surface activation treatment, such as corona discharge, active plasma, ultraviolet, laser, or high frequency treatment methods known to a person in the art.

Other methods of forming the active electrode material films and attaching the films to the current collector may also be used.

Figure 2A:
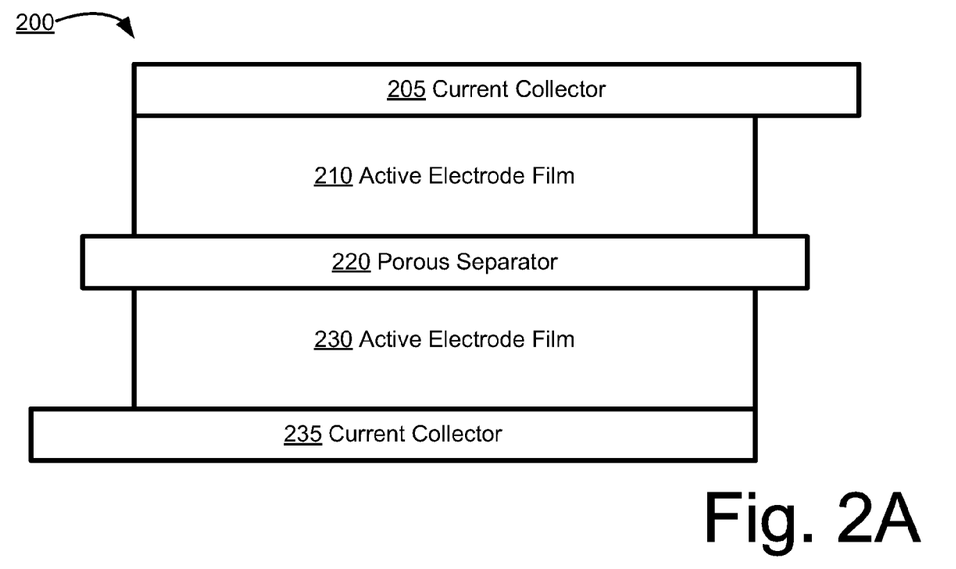
FIGS. 2A and 2B, illustrates a cross-section of respective electrode assemblies which may be used in an ultracapacitor; and, capacitors.
Figure 2B:
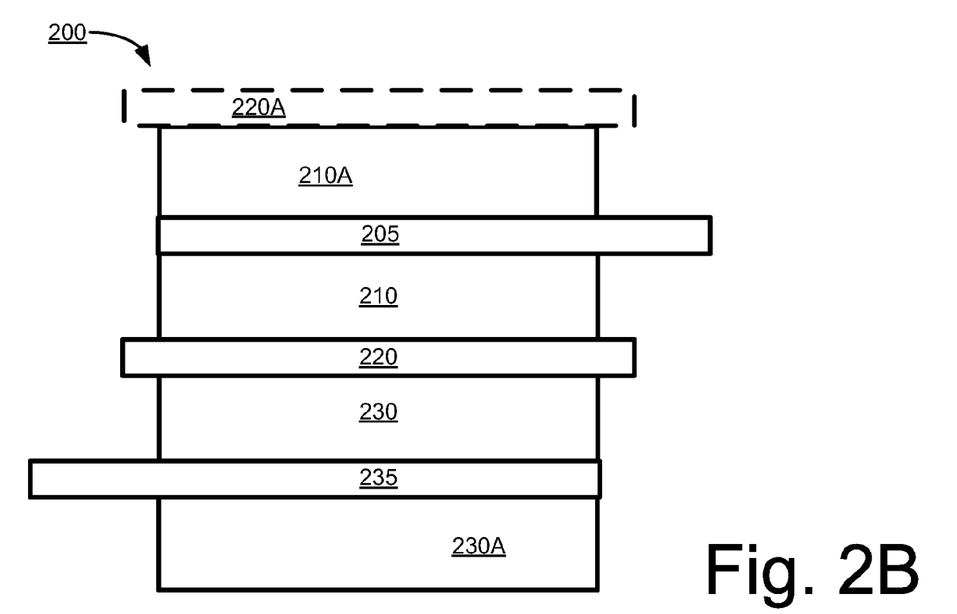

FIG. 2, including sub-part FIGS. 2A and 2B, illustrates, in a high level manner, respective cross-sectional views of an electrode assembly 200 which may be used in an ultracapacitor or a double layer capacitor. In FIG. 2A, the components of the assembly 200 are arranged in the following order: a first current collector 205, a first active electrode film 210, a porous separator 220, a second active electrode film 230, and a second current collector 235. In some implementations, a conductive adhesive layer (not shown) may be disposed on current collector 205 prior to bonding of the electrode film 210 (or likewise on collector 235 relative to film 230). In FIG. 2B, a double layer of films 210 and 210A are shown relative to collector 205, and a double layer 230, 230A relative to collector 235. In this way, a double-layer capacitor may be formed, i.e., with each current collector having a carbon film attached to both sides. A further porous separator 220A may then also be included, particularly for a jellyroll application, the porous separator 220A either attached to or otherwise disposed adjacent the top film 210A, as shown or to or adjacent the bottom film 230A (not shown). The films 210 and 230 (and 210A and 230A, if used) may be made using particles of active electrode material obtained through the process 100 described in relation to FIG. 1. An exemplary double layer capacitor using the electrode assembly 200 may further include an electrolyte and a container, for example, a sealed can, that holds the electrolyte. The assembly 200 may be disposed within the container (can) and immersed in the electrolyte. In many implementations, the current collectors 205 and 235 may be made from aluminum foil, the porous separator 220 may be made from one or more ceramics, paper, polymers, polymer fibers, glass fibers, and the electrolytic solution may include in some examples, 1.5 M tetramethylammonium tetrafluoroborate in organic solutions, such as PC or Acetonitrile solvent. Alternative electrolyte examples are set forth below.

Electrode products that include an active electrode film attached to a current collector and/or a porous separator may be used in an ultracapacitor or a double layer capacitor and/or other electrical energy storage devices.

In some implementations using a process 100, wherein activated carbon with no more than about 300 ppm or in some cases no more than about 50 ppm of sulfur is used, a high performance ultracapacitor or double-layer capacitor product can be provided. Such a product further may include about 10 percent by weight binder, and about 0.5 percent by weight conductive carbon.

Figure 3:
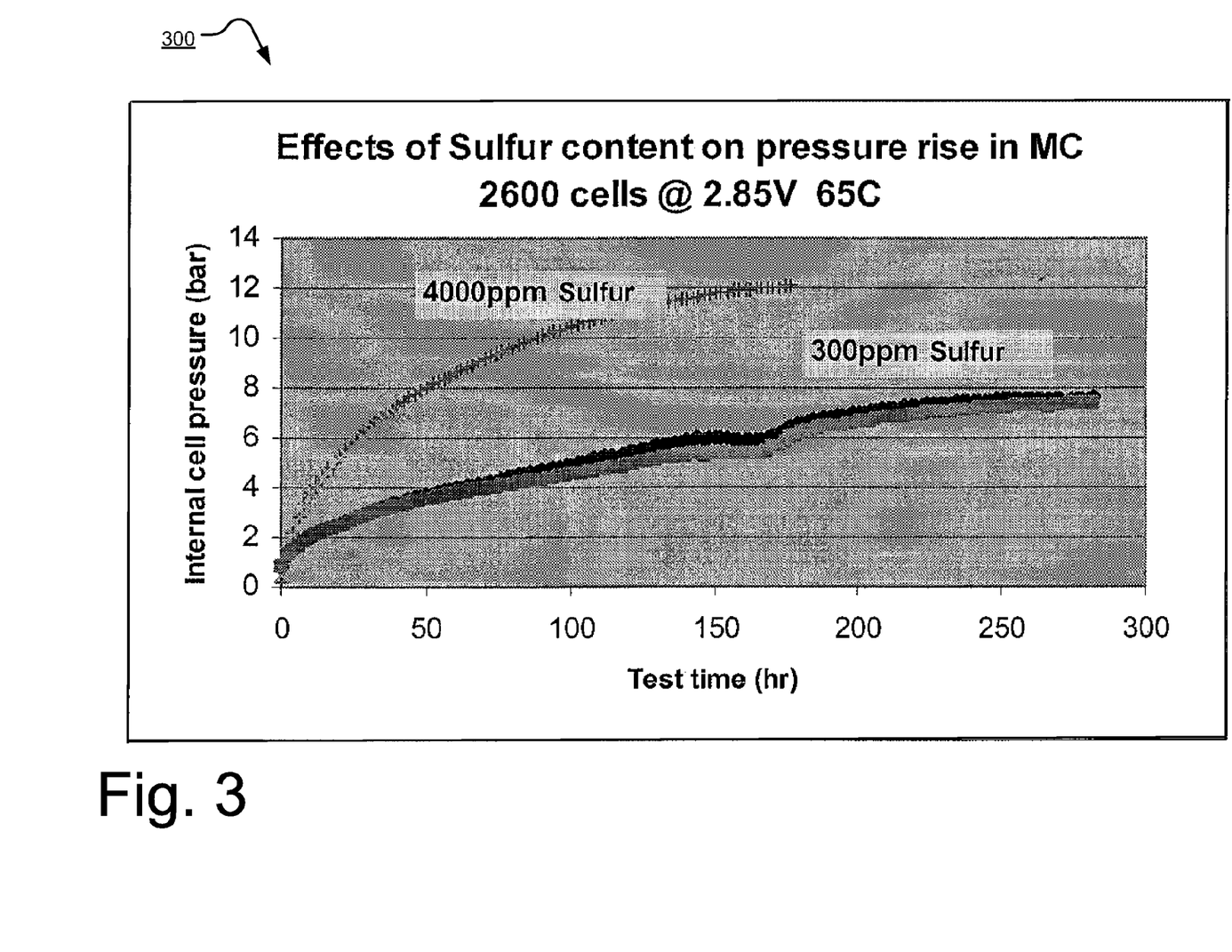
FIG. 3 illustrates data for corresponding electrode assemblies of double layer capacitors.

According hereto, a powder electrode mixture may be provided by and include an activated carbon component having a sulfur content between about 0 and about 50 ppm, or in some implementations, less than about 50 ppm, and could provide a very low leakage current of a resultant electrode of about 1.0 nA/F (which could occur after about 72 hours at about 2.5V). In a particular example, a powder mixture with a sulfur content of less than about 300 ppm may provide a leakage current of a resultant electrode of 1.92 nA/F after 72 hours at 2.5V. This is a desirable result, as indicative of improvement in an ultracapacitor life performance, perhaps including capacitance, resistance degradation, and/or gas generation. Faradic reaction in an ultracapacitor may also/alternatively be reduced thereby improving the voltage application window. These may be compared with a conventional activated carbon with a sulfur content of 4000 ppm which yielded a leakage current of 2.5 nA/F after 72 hours at 2.5V. Other data may be found in gas generation of the cell which can be measured by cell pressure. For the 4000 ppm sulfur example, cell pressure increased to approximately 14 bars in approximately 200 hours at 2.85V, 65C. This may be compared to the 300 ppm example where the pressure increased less than 8 bars in about 250 hours at 2.85V, 65C. A graph 300 of these two examples is shown in FIG. 3, run out to greater than 250 hours for the 300 ppm example. Even with this drastic reduction in gas generation, such an increase will likely be improved to a more acceptable level using a specification of less than 50 ppm of sulfur in the activated carbon component of the electrode mixture.

Thus, in many implementations, controlling the sulfur content of the electrode material mixture would typically include controlling the content of sulfur in the raw materials, i.e., the component elements to be added to the mixture. Primarily, this would include controlling the sulfur content of the activated carbon, the binder contributing little if any sulfur. If optional conductive carbon is added, then the sulfur content hereof may also be controlled. Thus, a resultant electrode material content of between about 0 and about 300 parts per million, and in some instances at or about less than about 300 ppm, or even at or less than about 50 ppm may be obtained by reducing and/or controlling the respective amounts of sulfur in each of the raw materials to be added to the mixture.

Following are several non-limiting examples of aqueous electrolytes which may be used in double-layer capacitors or ultracapacitors hereof: 1-molar Sodium sulphate, $Na_2SO_4$; 1-molar Sodium perchlorate, $NaClO_4$; 1-molar Potassium hydroxide, KOH; 1-molar Potassium chloride, KCl; 1-molar Perchloric acid, $HClO_4$; 1-molar Sulfuric acid, $H_2SO_4$; 1-molar Magnesium chloride, $MgCl_2$; and, Mixed aqueous 1-molar $MgCl_2/H_2O$/Ethanol. Some non-limitative nonaqueous aprotic electrolyte solvents which can be used in capacitors include: Acetonitrile; Gamma-butyrolactone; Dimethoxy-ethane; N,N,-Dimethylformamide; Hexamethyl-phosphoro-triamide; Propylene carbonate; Dimethyl carbonate; Tetrahydrofuran; 2-methyltetra-hydrofuran; Dimethyl sulfoxide; Dimethyl sulfite; Sulfolane (tetra-methylenesulfone); Nitromethane; and, Dioxolane. Further, some non-limiting examples of electrolyte salts which can be used in the aprotic solvents include: Tetraalkylammonium salts (such as: Tetraethylammonium tetrafluoroborate, $(C_2H_5)_4NBF_4$; Methyltriethylammonium tetrafluoroborate, $(C_2H_5)_3CH_3NBF_4$; Tetrabutylammonium tetrafluoroborate, $(C_4H_9)_4NBF_4$; and, Tetraethylammonium hexafluorophosphate $(C_2H_5)NPF_6$); Tetraalkylphosphonium salts (such as: Tetraethylphosphonium tetrafluoroborate $(C_2H_5)_4PBF_4$; Tetrapropylphosphonium tetrafluoroborate $(C_3H_7)_4PBF_4$; Tetrabutylphosphonium tetrafluoroborate $(C_4H_9)_4PBF_4$; Tetrahexylphosphonium tetrafluoroborate $(C_6H_{13})_4PBF_4$; Tetraethylphosphonium hexafluorophosphate $(C_2H_5)_4PPF_6$; and, Tetraethylphosphonium trifluoromethylsulfonate $(C_2H_5)_4PCF_3SO_3$; and Lithium salts (such as: Lithium tetrafluoroborate $LiBF_4$; Lithium hexafluorophosphate $LiPF_6$; Lithium trifluoromethylsulfonate $LiCF_3SO_3$). Additionally, some Solvent free ionic liquids which may be used include: 1-ethyl-3-methylimidazolium bis(pentafluoroethylsulfonyl) imide EMIMBeTi; 1-ethyl-3-methylimidazolium bis(trifluoromethylsulfonyl imide EMIMIm; EMIIm; EMIBeti; EMI-Methide; DMPIIm; DMPIBeti; DMPIMethide; BMIIm; BMIBeti; BMIMethide; PMPIm; and, BMPIm. Examples for use as Anions include: bis(trifluoromethylsulfonyl)imide $(CF_3SO_2)_2N^-$; bis(perfluoroethylsulfonyl)imide $(C_2F_5SO_2)_2N^-$; and, tris(trifluoromethylsulfonyl)methide $(CF_3SO_2)_3C^-$. And, examples for use as Cations include: EMI: 1-ethyl-3-methylimidazolium; DMPI: 1,2-dimethyl-3-propylimidazolium; BMI: 1-butyl-3-methylimidazolium; PMP: 1-N-propyl-3-methylpyridinium; and, BMP: 1-N-butyl-3-methylpyridinium.

The inventive methods for making active electrode material, films of these materials, electrodes made with the films, and double layer capacitors employing the electrodes have been described above in considerable detail. This was done for illustrative purposes. Neither the specific implementations of the invention as a whole, nor those of its features, limit the general principles underlying the invention. In particular, the invention is not necessarily limited to the specific constituent materials and proportions of constituent materials used in making the electrodes. The invention is also not necessarily limited to electrodes used in double layer capacitors, but extends to other electrode applications. The specific features described herein may be used in some implementations, but not in others, without departure from the spirit and scope of the invention as set forth. Many additional modifications are intended in the foregoing disclosure, and it will be appreciated by those of ordinary skill in the art that, in some instances, some features of the invention will be employed in the absence of other features. The illustrative examples therefore do not define the metes and bounds of the invention and the legal protection afforded the invention, which function is served by the claims and their equivalents.

Accordingly, what is claimed is:

1. A method of making an active electrode material, the method comprising: providing activated carbon with a sulfur content in the range of about 0 and about 300 parts per million; providing binder; and, mixing the activated carbon and the binder to obtain a mixture of active electrode material.

2. A method in accordance with claim 1, wherein the providing activated carbon operation further comprises providing activated carbon with a sulfur content not exceeding about 50 parts per million.

3. A method in accordance with claim 1, wherein the mixture of active electrode material has a sulfur content in the range of about 0 and about 300 parts per million.

4. A method in accordance with claim 1, wherein the operation of providing the activated carbon includes providing activated carbon in amount of between about 80 and about 97 percent by weight, and wherein the operation of providing the binder includes providing binder in amount of between about 3 and about 20 percent by weight.

5. A method in accordance with claim 1, further comprising providing an additional additive component having a sulfur content not exceeding an amount whereby the mixture of active electrode material has a sulfur content in the range of about 0 and about 300 parts per million.

6. A method in accordance with claim 5, wherein the additional additive component is conductive carbon.

7. A method in accordance with claim 1, wherein the binder includes PTFE.

8. A method in accordance with claim 1, wherein the operation of mixing is performed without processing additives.

9. A method in accordance with claim 1, wherein the operation of mixing includes dry blending the activated carbon and the binder.

10. A method of making an active electrode material, the method comprising: providing activated carbon with a sulfur content in the range of about 0 and about 300 parts per million; providing low contamination level conductive carbon particles; providing binder; and, mixing the activated carbon, the conductive carbon, and the binder to obtain a mixture such that the mixture has a sulfur content in the range of about 0 and about 300 parts per million.

11. A method in accordance with claim 10, wherein the providing activated carbon operation further comprises providing activated carbon with a sulfur content not exceeding about 50 parts per million.

12. A method in accordance with claim 11, wherein the mixture has a sulfur content not exceeding about 50 parts per million.

13. A method in accordance with claim 10, wherein the providing conductive carbon operation further comprises providing conductive carbon with a sulfur content not exceeding about 300 parts per million.

14. A method in accordance with claim 13, wherein the providing conductive carbon operation further comprises providing conductive carbon with a sulfur content not exceeding about 50 parts per million, and wherein the mixture has a sulfur content not exceeding about 50 parts per million.

* * * * *